United States Patent Office 3,723,063
Patented Mar. 27, 1973

3,723,063
PROCESS FOR DETERMINATION OF CHEMICAL CONSTITUENTS OF PROTEINACEOUS BIOLOGICAL FLUIDS
Gerald M. Jones and Cleve W. Laird, Houston, Tex., assignors to Hycel, Inc., Houston, Tex.
No Drawing. Filed Feb. 19, 1971, Ser. No. 117,064
Int. Cl. G01n 33/16
U.S. Cl. 23—230 B                      26 Claims

ABSTRACT OF THE DISCLOSURE

A process for quantitatively determining a chemical constituent of a proteinaceous biological fluid by heating a sample of the fluid to clot the protein therein, contacting the sample with the clotted protein therein with a solvent for the chemical constituent, reacting the chemical constituent with a reagent to form a product that can be measured in the presence of the clotted protein, and then measuring the quantity of the chemical constituent present. A number of examples are set forth.

BACKGROUND OF THE INVENTION

The field of art to which the presently disclosed invention pertains is the process for determination of chemical constituents of biological fluids including blood, spinal fluid, tissue transudates and urine and in tissue extracts. These fluids, particularly in humans, frequently contain small quantities of chemical constituents such as creatinine, uric acid, urea, phosphorus and ions such as sodium, potassium and others. Medical science has long recognized the usefulness of tests for measuring the amounts or change of these chemical constituents as an aid in diagnosing certain medical conditions as is well known to those skilled in the art.

In testing body or biological fluids for certain chemical constituents, the presence of protein often hinders the test procedures and can lead to unreliable test results. For example, in spectrophotometric analysis of blood serum for creatinine with the well-known Jaffee reaction, positive error is introduced unless protein in the serum is precipitated and removed prior to measurement of absorbance or optical density. Further, the method of protein precipitation can lead to discrepancies in the apparent amount of creatinine measured since the color reaction is pH dependent. By way of further example, in the analysis of blood serum for determination of uric acid. the presence of protein causes cloudiness or turbidity which makes spectrophotometric analysis difficult and inaccurate.

Because of problems due to protein as just discussed, conventional tests for determination of some chemical constituents of biological fluids containing protein have involved procedures whereby the protein is separated from the remainder of the fluid to be tested. Not only is the removal of protein time-consuming and hence an expensive step when many tests are run, but it introduces the possibility of additional human error which is intolerable in clinical analyses. Furthermore, when protein remains in the solution to be tested, situations arise wherein the chemical constituent to be determined in some instances may be adsorbed onto the protein thereby causing inaccurate or unreliable test results.

The method of the present invention advantageously overcomes the foregoing difficulties by obviating the necessity of separating protein from the sample of fluid. Also, the present invention permits the use of much smaller samples of fluid in making the necessary tests.

SUMMARY OF THE INVENTION

It is a general object of the present invention to provide a process for detection of a chemical constituent of a proteinaceous biological fluid.

A further object of the present invention is the provision of a process for quantitatively determining the chemical constituent of such a fluid from which the protein has not beeen removed.

A still further object of the present invention is to provide such a process wherein the fluids tested are selected from the group consisting of blood, spinal fluid, tissue transudates and tissue extracts and urine.

Other and further objects, features and advantages will be apparent from the following description of the presently preferred examples of the present invention given for the purpose of disclosure.

The present invention is based upon a discovery that certain chemical constituents of biological fluids such as blood and the plasma or serum thereof, spinal fluid, tissue transudates and tissue extracts and urine may be determined by testing the fluids containing protein wherein only a relatively small sample of each fluid need be used. The sample is heated to clot the protein and is then contacted with a solvent for the chemical constituent to be determined, the solvent dissolving the chemical constituent without dissolving the protein. A reagent reactive with the chemical constituent to form a product which can be measured is then added to the solution containing the clotted protein. The resulting solution containing the product is then measured, either in the container with the clotted protein or an aspirated portion thereof. In effect, the protein is moved aside but not removed or changed chemically. Consequently, the testing for chemical constituent can be carried out without separating the protein from the solution. Not only does this reduce handling requirements and the likelihood of error, it also facilitates and makes economic the automation of such testing.

DESCRIPTION OF THE PREFERRED EMBODIMENT

In the preferred embodiment of the present invention, creatinine, uric acid, urea, phosphorus and ions such as sodium and potassium may be determined quantitatively in biological fluids such as blood, spinal fluid, tissue transudates and tissue extracts and urine. In the testing of blood, the preferred method is to provide a serum by removing fibrin and corpuscles from the blood. However, plasma may be tested by the method of the present invention if a suitable anti-coagulant is added to the whole blood prior to the removal of the cells.

As explained above, the quantitative determination of chemical constituents of biological fluids has been carried out conventionally by heating the fluid to clot the protein, extracting the chemical constituent from the clotted protein by use of a solvent, physically separating the resulting solution from the clotted protein and making a quantitative measurement of the subject chemical constituent. The attendant disadvantages of this method and other conventional techniques likewise have been explained. Heretofore, it has been understood by those skilled in the art that the protein must be separated or otherwise reacted in order to effectively carry out reliable quantitative determinations of chemical constituents of the fluid. However, the present invention is based on the discovery that the protein can be clotted and in effect moved aside and quantitative analytical measurements made while the test fluid sample is in contact with the clotted protein or simply aspirated for test purposes. This technique makes possible the use of a conventional quantitative determination protocol without the time-consuming protein separation or protein reaction requirements thereby promoting reliability of test results and reducing the chance of human error.

Quantitative determination of chemical constituents of proteinaceous biological fluids that are effected by the presence of protein include determinations for creatinine, uric acid, urea, phosphorus and ions such as sodium and potassium and others. For example, the Jaffee reaction has long been used in the quantitative determination of creatinine in proteinaceous biological fluids as described in the textual discussion of "Creatinine and Creatine" at pp. 287–302 of Clinical Chemistry Principlse and Techniques, by Richard J. Henry, M.D., published in 1965 by Harper and Row. Still further descriptions of creatinine determinations are found in "Determination of Creatinine in Small Quantities of Plasma" at pp. 233–242 of Clinical Chemistry, volume 6, No. 3, 1960, by Edward Martinez and Paul D. Doolan; Creatinine" at pp. 55–59 of Standard Methods of Clinical Chemistry, volume I, published by American Association of Clinical Chemistry in 1953; "Effect of Various Protein Precipitants on Recoveries of Creatinine Added to Plasma" at pp. 90–94 of Clinical Chemistry, volume 3, No. 2, 1957, by John F. Van Pilsum and M. Bovis; and "True" Creatinine Cromogen Determination and Serum and Urine by Semi-automated Analysis'" at pp. 763–770 of Clinical Chemistry, volume 11, No. 8, 1965, by E. Polar and J. Metcoff.

With regard to determination of other chemical constituents, a process for detecting uric acid in blood serum is disclosed in U.S. Pat. No. 3,528,777 entitled "Process and Compositions for Determination of Uric Acid in Blood Serum."

The determination of urea nitrogen is disclosed, for example, in a brochure entitled "Hycel Direct Urea Nitrogen Determinations," copyright 1968, published by Hycel, Inc., P.O. Box 36329, Houston, Tex. 77036.

A determination for phosphorus is disclosed in a brochure entitled "Hycel Phosphorus Determination," copyright 1965, published by Hycel, Inc., P.O. Box 36329, Houston, Tex. 77036.

The determinations described in the foregoing literature as well as others may be adapted to incorporate the methods of the present invention as will be exemplified in the following examples which are set forth for illustration rather than limitation.

EXAMPLE I

The quantitative determination of creatinine in blood serum was carried out spectrophotometrically by first preparing a standard and a standard curve. The standard for this determination was prepared by dissolving a known amount of pure creatinine in an acid diluent. This stock standard was then further diluted with a protein diluent to make working standards that resemble the fluid to be tested. In doing so, a creatinine standard solution was mixed with 6% albumin to provide solutions having five mg. percent, 10 mg. percent, 15 mg. percent, and 20 mg. percent creatinine ("mg. percent"=milligrams per 100 milliliters of solution). Then in timed relation as will be described with respect to the sample of this example, the absorbance or optical density of the standards was read against a blank at 520 m$\mu$. (millimicrons) in a Coleman 6/20 spectrophotometer. Thereafter, a standard curve was prepared of the optical absorbance versus concentration of the standards by plotting concentrations as the abscissa and optical absorbance as the ordinate. The following absorbance units were measured for the respective concentrations of the standard:

Mg. percent:
5 _____ .094
10 _____ .188
15 _____ .288
20 _____ .376

The sample to be tested for creatinine was a blood serum without the protein removed sold under the trade name "Versatol" by Warner-Chilcott, Morris Plains, N.J. A 0.1 ml. aliquot of serum was pipetted directly into the bottom of a 19 x 150 mm. cuvette which was then placed in rapidly boiling water for exactly three minutes to clot or coagulate the protein. Then the cuvette was cooled in tap water and the sample in the cuvette was overlaid with three ml. of deionized water and returned to the boiling water bath to extract the creatinine from the clotted protein material. The water bath was immediately turned off and the tubes allowed to stand therein for ten minutes and upon removal were cooled with tap water.

Three milliliters of alkaline picrate solution were added to the tube or cuvette, the alkaline picrate solution having been prepared by mixing 60 ml. of a saturated solution of picric acid with 40 ml. 0.41 N sodium hydroxide. Upon addition of the alkaline picrate solution to the sample contained in the tube to react with the creatinine for purposes of color formation, the tube was allowed to stand at room temperature for exactly 15 minutes. Then the tube with the protein material at the bottom and the solution above it, was placed in a Coleman spectrophotometer and the optical density of the solution was measured at 520 m$\mu$ against a reagent blank containing 0 mg. percent creatinine. The absorbance reading was 0.030 absorbance units corresponding to 1.6 mg. percent creatinine read from the standard curve prepared as previously described. The assay value given by the manufacturer for creatinine content of that sample of Versatol was 1.6 mg. percent.

EXAMPLE II

To illustrate the efficacy of the protocol described in Example I, another aliquot of the same Versatol serum sample was tested quantitatively for creatinine content. The sample was tested by means of a Mark X type automated analyzer manufactured by Hycel, Inc., Houston, Tex. The procedure, even though automated, was similar to that of Example I except that a heating block was used in place of the boiling water bath. The Mark X method analyzed 1.5 mg. percent versus the 1.6 mg. percent printed value given by the manufacturer which is well within expected tolerance limits for the test.

EXAMPLE III

In this example, a comparison was made of the method of Example I with a conventional Jaffee reaction method wherein protein was clotted and removed prior to measurement of absorbance. In so doing, another aliquot of the Versatol sample of Example I was analyzed for creatinine by the procedure described in "Analyses on Heat-Coagulated Blood and Serum" at pages 970–975 of Clinical Chemistry, volume 13, No. 11, 1967, by Morris London, Ida A. Freiberger and Jesse H. Marymont, Jr. The so-called London method resulted in a determination of 2.0 mg. percent creatinine versus the 1.6 mg. percent determination by the method of Example I and the 1.6 mg. percent printed assay value.

In carrying out the London test, severe difficulty was encountered in duplicating the published method. Specifically, there was too little supernatant liquid above the clotted protein for effective withdrawal for photometric determination which had not been a hindrance in the method of Example I.

EXAMPLE IV

To demonstrate that other fluids may be quantitatively determined by the present invention, samples of urine and tissue extract were diluted in a solution of six percent albumin. Aliquots of 0.1 ml. of the diluted preparations and standards were placed in 19 x 150 mm. cuvettes which in turn were placed in boiling water for exactly 3 minutes and cooled in tap water. The resulting clots were overlaid with 3 ml. of deionized water and returned to the boiling water bath, heat to which was then turned off immediately. The tubes were allowed to stand 10 minutes before removal and cooling in tap water. 3.0 ml. of alkaline picrate solution (as prepared in Example I) was added to each tube at timed intervals after which the tubes were allowed to stand at room temperature for exactly 15 minutes. Optical density of each sample was then read on a spectrophotometer against a reagent blank at 520 m$\mu$ in timed sequence. While no assay or comparative values were available for the samples, test values were commensurate with the quantity of creatinine normally expected in urine and tissue extract indicating feasibility of the present invention for such tests.

EXAMPLE V

Uric acid content of blood serum was quantitatively determined by first preparing standard solutions and a standard curve wherein the standard solutions were subjected to the protocol as will be described in this example and wherein the standard curve was prepared by the technique explained in Example I.

Three samples to be tested were (1) a blood serum without the protein removed sold under the trade name "Versatol" by Warner-Chilcott, Morris Plains, N.J., (2) a blood serum without the protein removed sold under the trade name "Monitrol I" by Dade Reagents Incorporated, Miami, Fla., and (3) a blood serum containing protein sold under the trade name "Monitrol II" by the same company. The standards and samples were subjected to a protocol that included pipetting 0.1 ml. each of the serums, water and standards into 19 x 150 mm. cuvettes. These cuvettes were heated in a boiling water bath for exactly three minutes to clot the protein and then cooled in tap water. One ml. deionized water was added to each tube which was then returned to the boiling water bath and heat to the bath was turned off. The tubes were allowed to stand in the hot bath for ten minutes before being removed and again cooled in tap water. Then 3.0 ml. sodium carbonate reagent was added in timed 30 seconds sequence to the tubes by flowing the reagent down the side in each tube to extract the uric acid from the clotted protein material.

Exactly 20 minutes after the sodium carbonate reagent was added to the first tube, 3.0 ml. of phosphotungstic acid (for color reaction with the uric acid) was added in timed 30 second sequences directly into the center of each cuvette. The tubes or cuvettes then were allowed to stand at room temperature for exactly 20 minutes at which time the optical density of the solution above the clotted protein in each tube was read on a Coleman spectrophotometer against a reagent blank at 580 m$\mu$.

The test run on the Versatol gave an optical density or absorbance reading corresponding to 3.5 mg. percent uric acid whereas the assay value given by the manufacturer for uric acid content of that sample was 3.1 mg. percent. The test on the Monitrol I gave an optical density or absorbance reading corresponding to 5.9 mg. percent uric acid whereas the assay value given by the manufacturer for uric acid content of that sample was 5.2 mg. percent. The test run on the Monitrol II sample resulted in an optical density or absorbance reading corresponding to 8.8 mg. percent uric acid whereas the assay value given by the manufacturer for uric acid content of that sample was 9.1 mg. percent. All of these percentages are well within the expected tolerance of such test.

EXAMPLE VI

The determination of urea nitrogen in blood serum was carried out by preparing standards (and hence a standard curve) and samples consisting of Versatol A (Warner-Chilcott) and Monitrol II (Dade) serums. 0.1 ml. each was added to 19 x 150 mm. cuvettes which were each placed in boiling water for exactly three minutes to clot the protein and then cooled in tap water. The clot in each tube was overlaid with 1 ml. of 157 mg. percent 2,3 butanedione monoxime in water and returned to the boiling water bath at which time heat to the bath was turned off and the tubes allowed to stand 10 minutes for extraction of the urea. The tubes were then removed from the bath and cooled in tap water.

To each tube was then added 5 ml. of 14.2 mg. percent thiosemicarbazide in 58 percent phosphoric acid for the color formation reaction with the urea. Each tube was then returned to the boiling water bath for exactly eight minutes and removed and cooled with tap water. Optical density or absorbance readings of the solution above the clotted protein in each container or tube were made agains a reagent blank 525 m$\mu$ in the spectrophotometer.

The test on the Versatol A serum gave an absorbance or optical density reading of 59.0 mg. percent urea nitrogen whereas the assay value given by the manufacturer for urea nitrogen content of that sample was 6.10 mg. percent. The test on the Monitrol II serum gave an absorbance reading corresponding to 32.7 mg. percent urea nitrogen versus 33.3 mg. percent assay value given by the manufacturer. Again, the percentages are well within the expected tolerance of such test.

EXAMPLE VII

Tests were run to determine the phosphorus content of heat coagulated blood serums by preparing phosphorus standard solutions and a standard curve. In carrying out the tests, 0.2 ml. each of serums (Versatol and Monitrol II), water and phosphorus standards were pipetted into 19 x 150 mm. cuvettes and heated in boiling water for exactly three minutes to coagulate the protein in the serums. After cooling each cuvette or container to room temperature, 1.0 ml. of 5.5 percent $H_2SO_4$ (vol./vol.) was added to each to extract and dissolve the phosphorus from the protein material. Each container was then placed back in the boiling water bath (heat to which was then turned off) for 10 minutes. Then 5.0 ml. phosphorus reagent was added to each container as a color producing reactant with the phosphorus, the reagent consisting of 0.2 percent molybdate, 0.4 percent ferrous ammonium sulfate, 5.5 percent sulfuric acid and the remainder water. Each container or cuvette was allowed to stand room temperature for 30 minutes.

Each sample was then placed in a Coleman spectrophotometer and the optical density of the solution above the coagulated protein was read at 650 m$\mu$ against a reagent blank. The test run on the Versatol gave absorbance readings corresponding to 3.7 mg. percent phosphorus versus an assay value given by the manufacturer of 3.9 mg. percent for phosphorus. The Monitrol II serum sample gave an absorbance reading corresponding to 6.5 mg. percent phosphorus whereas the assay value given by the manufacturer for phosphorus content of that sample was 6.4 mg. percent. These percentages are well within the expected tolerance of the test.

EXAMPLE VIII

To demonstrate that the heat coagulating technique of the present invention is applicable to the determination of ion content of proteinaceous biological fluids, tests were run on serums including Versatol, Versatol A (both manufactured by Warner-Chilcott), Montrol I and Monitrol II (Dade Reagents Incorporated). In carrying out the tests, 0.1 ml. of each serum was placed in 19 x 150 mm. cuvettes. It should be noted that all glassware (cuvettes and pipettes) was rendered ion-free by washing in 10 percent $HNO_3$. Then the cuvettes were placed in a boiling water bath for exactly three minutes to clot the protein in each sample, removed and then cooled in tap water. 2.0 ml. of deionized water was added to each tube which was then held in a boiling water bath (heat to the bath having been cut off upon addition of the tube) for exactly ten minutes in order to extract the ions from the proteinaceous material.

Upon removal from the water bath, each cuvette was cooled in tap water and to each was added 8.0 ml. of deionized water and 10.1 ml. of 30 meq./l. lithium sulfate diluent.

The samples were then placed in a direct reading flame photometer which had previously been standardized in order to measure the intensities of the spectrum lines of the sodium and potassium present in each sample. The intensities measured correspond to sodium and potassium content as follows:

| Serum control | Sodium | | Potassium | |
|---|---|---|---|---|
| | Test value (meq./l.) | Mfg. assay value (meq./l.) | Test value (meq./l.) | Mfg. assay value (meq./l.) |
| Versatol | 137 | 139 | 4.5 | 4.9 |
| Versatol A | 123 | 124 | 6.2 | 7.2 |
| Versatol A (alternate) | 148 | 155 | 2.9 | 3.1 |
| Monitrol I | 140 | 139 | 4.4 | 4.4 |
| Monitrol II | 120 | 141 | 5.7 | 6.0 |

It will be recognized that the foregoing values are well within the expected tolerance of such tests. Of course, the ionic concentration may be measured by several other methods known in the art.

In actual practice, it may be desirable to aspirate the product of the chemical reaction for reading, in which event, a transparent tube for the clotting and solvent steps would not be required. In this case, in the foregoing examples, the sample is heated in a tube or other container to clot the protein therein, which tube or container need not be transparent, the sample is then contacted with a solvent which places the chemical constituent in solution, the reagent which reacts with the chemical constituent to form a product which can be measured is added, a portion of the solution with the resulting product is aspirated, and the quantity of the product in the aspirated solution is measured.

The preceding examples illustrate the unique advantage of the present invention whereby the protein of biological fluids is changed sufficiently by the heat clotting or coagulating step so as to not interfere with the determination of chemical constituents of those fluids without separation or further treatment of the protein. It will be understood, of course, that the test procedures, reagents, volumes, times and other factors involved in the test protocols can be changed or adjusted in ways that are well known to those skilled in the art.

From the foregoing discussions, examples and description of the invention, it is apparent that the objects set forth herein as well as others have been achieved. Those skilled in the art will recognize that the principle of this invention may be applied in several ways, only a few of which have been exemplified here specifically. Accordingly, the invention is to be limited by the spirit thereof and the scope of the appended claims.

What is claimed is:

1. A method for quantitatively determining a chemical constituent of a proteinaceous biological fluid comprising the steps of,
   (a) heating a sample of the fluid to clot the protein therein,
   (b) contacting the sample from step (a) containing clotted protein with a solvent for the chemical constituent,
   (c) placing in the solution from step (b) containing the clotted protein a measured amount of a reagent which reacts with the chemical constituent to form a product that can be measured, and
   (d) measuring the quantity of the product formed in step (c).

2. The process of claim 1 wherein the biological fluid is selected from the group consisting of blood, spinal fluid, tissue transudates, urine and tissue extracts.

3. The process of claim 1 wherein step (d) is carried out while the product from step (c) is in contact with the solution containing the clotted protein from step (b).

4. The process of claim 1 wherein step (d) is carried out by aspirating at least a portion of the solution containing the product from step (c) and measuring the quantity of product in said aspirated portion.

5. A method for quantitatively detecting a chemical constituent of a proteinaceous biological fluid selected from the group consisting of blood, spinal fluid, tissue transudates, urine and tissue extracts, comprising the steps of,
   (a) placing the sample of the fluid in a container,
   (b) heating the container so that the protein of the sample therein is clotted,
   (c) overlaying the sample in the container with a solvent to place the chemical constituent in solution,
   (d) in the solution containing the clotted protein resulting from step (c), placing a measured amount of a reagent which reacts with the chemical constituent to form a product which can be measured, and
   (e) measuring the optical absorbance of at least a portion of the solution containing the product.

6. The method of claim 5 wherein the proteinaceous biological fluid is blood or the plasma or serum thereof.

7. The method of claim 5 wherein the chemical constituent is selected from the group consisting of creatinine, uric acid, urea nitrogen and phosphorus.

8. The method of claim 5 including the further step of comparing the optical absorbance determined in step (d) with the optical absorbance of samples of a standard containing known quantities of the chemical constituent.

9. A method for quantitatively determining the chemical constituent of a proteinaceous biological fluid comprising the steps of,
   (a) heating a sample of the fluid to clot the protein therein,
   (b) contacting the sample with clotted protein resulting from step (a) with a solvent for the chemical constituent,
   (c) adding to the solution containing clotted protein from step (b) a reagent which reacts with the chemical constituent to form a product that can be measured,
   (d) aspirating at least a portion of the solution containing the product resulting from step (c), and
   (e) measuring the quantity of product in the aspirated solution.

10. A method for quantitatively detecting a chemical constituent of a proteinaceous biological fluid selected from the group consisting of blood, spinal fluid, tissue transudates, urine and tissue extracts, comprising the steps of,
    (a) placing the sample of the fluid in a container,
    (b) heating the container so that the protein of the sample therein is clotted,
    (c) overlaying the sample in the container with a solvent to place the chemical constituent in solution,
    (d) adding to the solution containing clotted protein from step (c) a reagent which reacts with the chemical constituent to form a product that can be measured,
    (e) aspirating at least a portion of the solution with the product from step (d), and
    (f) measuring the optical absorbance of the aspirated solution containing the product.

11. The method of claim 10 wherein the proteinaceous biological fluid is selected from the group consisting of blood, plasma, and serum thereof.

12. The method of claim 10 wherein the chemical constituent is selected from the group consisting of creatinine, uric acid, uric nitrogen and phosphorus.

13. A method for detecting creatinine in a proteinaceous biological fluid, comprising the steps of,
    (a) heating a sample of the fluid so that the protein therein is clotted,
    (b) cooling the sample,
    (c) overlaying the clotted protein with water followed by again heating and cooling the sample,
    (d) adding a measured amount of alkaline picrate solution, and
    (e) after completion of the reaction caused by step (d), measuring the optical absorbance of the liquid.

14. The method of claim 13 wherein the biological fluid is selected from the group consisting of blood, spinal fluid, tissue transudates, urine and tissue extract.

15. The method of claim 13 wherein the proteinaceous biological fluid is blood or the plasma or serum thereof.

16. A method for detecting uric acid in a proteinaceous biological fluid, comprising the steps of,
(a) heating a sample of the fluid so that the protein therein is clotted,
(b) cooling the sample,
(c) adding to the sample from step (b) measured amounts of sodium carbonate and phosphotungstic acid reagents, and
(d) after completion of the reaction caused by step (c), measuring the optical absorbance of the liquid.

17. The method of claim 16 wherein the biological fluid is selected from the group consisting of blood, spinal fluid, tissue transudates, urine and tissue extract.

18. The method of claim 16 wherein the proteinaceous biological fluid is blood or the plasma or serum thereof.

19. A method for detecting urea nitrogen in a proteinaceous biological fluid, comprising the steps of,
(a) heating a sample of the fluid so that the protein therein is clotted,
(b) adding to the sample from step (a) measured amount of 2,3, butanedione monoxime, thiosemicarbazide and phosphoric acid,
(c) heating the mixture resulting from step (b), and
(d) after completion of the reaction caused by steps (b) and (c), measuring the optical absorbance of the liquid.

20. The method of claim 19 wherein the proteinaceous biological fluid is blood or plasma or serum thereof.

21. A method for detecting phosphorus in a proteinaceous biological fluid, comprising the steps of,
(a) heating sample of the fluid so that the protein therein is clotted,
(b) cooling the sample and adding a measured amount of sulfuric acid and again heating and cooling the sample,
(c) adding to the sample from step (b) measured amounts of ammonium molybdate, ferrous ammonium sulfate, sulfuric acid and water, and
(d) after completion of the reaction caused by step (c), measuring the optical absorbance of the liquid.

22. The method of claim 21 wherein the biological fluid is selected from the group consisting of blood, spinal fluid, tissue transudates, urine and tissue extract.

23. The method of claim 21 wherein the proteinaceous biological fluid is blood or the plasma or serum thereof.

24. A method for detecting ions selected from the group consisting of sodium and potassium in a proteinaceous biological fluid comprising the steps of,
(a) heating a sample of the fluid so that the protein therein is clotted,
(b) cooling the sample,
(c) adding a measured amount of water to the sample, and heating and then cooling the sample,
(d) adding to the sample from step (c) a measured amount of lithium sulfate, and
(e) after completion of step (d), measuring by flame photometry the quantity of ion material in the mixture resulting from step (d).

25. The method of claim 24 wherein the biological fluid is selected from the group consisting of blood, spinal fluid, tissue transudates, urine and tissue extract.

26. The method of claim 24 wherein the proteinaceous biological fluid is blood or the plasma or serum thereof.

References Cited

UNITED STATES PATENTS

| | | | |
|---|---|---|---|
| 3,567,374 | 3/1971 | Wybenga | 23—230 |
| 3,536,448 | 10/1970 | Patel | 23—230 |

OTHER REFERENCES

Hawk, P. B. et al., Practical Physiological Chemistry, pp. 178–80, 195, 540–43 (1954).

Hycel Urea Nitrogen Determinations (1964).

Hycel Phosphorus Determinations (1965).

Hawk, P. B. et al., Practical Physiological Chemistry, pp. 649–55 (1954).

MORRIS O. WOLK, Primary Examiner

R. M. REESE, Assistant Examiner